United States Patent
Koo et al.

(10) Patent No.: US 11,278,024 B2
(45) Date of Patent: Mar. 22, 2022

(54) COMPOSITION CONTAINING GERANIOL FOR CONTROL OF PLANT-PARASITIC NEMATODES

(71) Applicant: Kyung Bon Koo, Daegu (KR)

(72) Inventors: Kyung Bon Koo, Daegu (KR); Hyung Chul Lee, Daegu (KR)

(73) Assignee: Kyung Bon Koo, Daegu (KR)

( * ) Notice: Subject to any disclaimer, the term of this patent is extended or adjusted under 35 U.S.C. 154(b) by 214 days.

(21) Appl. No.: 16/759,462

(22) PCT Filed: Nov. 2, 2017

(86) PCT No.: PCT/KR2017/012312
§ 371 (c)(1),
(2) Date: Apr. 27, 2020

(87) PCT Pub. No.: WO2019/088319
PCT Pub. Date: May 9, 2019

(65) Prior Publication Data
US 2020/0296957 A1    Sep. 24, 2020

(51) Int. Cl.
*A01N 31/02* (2006.01)
*A01N 65/10* (2009.01)
*A01N 65/26* (2009.01)
*A01N 65/28* (2009.01)
*A01N 49/00* (2006.01)

(52) U.S. Cl.
CPC .............. *A01N 31/02* (2013.01); *A01N 65/10* (2013.01); *A01N 65/26* (2013.01); *A01N 65/28* (2013.01)

(58) Field of Classification Search
CPC ........ A01N 31/02; A01N 64/10; A01N 65/26; A01N 65/28; A01N 49/00
See application file for complete search history.

(56) References Cited

FOREIGN PATENT DOCUMENTS

| JP | 2003-171217 A | 6/2003 |
|---|---|---|
| JP | 2009-235049 A | 10/2009 |
| KR | 10-1995-0013512 A | 6/1995 |
| KR | 10-2007-0065938 A | 6/2007 |
| KR | 10-2009-0002561 A | 1/2009 |
| KR | 10-2009-0011029 A | 1/2009 |
| KR | 10-2016-0000659 A | 1/2016 |
| KR | 10-2017-0124329 A | 11/2017 |

OTHER PUBLICATIONS

Echeverrigaray, S. et al., "Nematicidal Activity of Monoterpenoids against the Root-knot Nematode Meloidogyne Incognita". Phytopathology, 2010, vol. 100, No. 2, pp. 199-203.

*Primary Examiner* — Trevor Love
(74) *Attorney, Agent, or Firm* — Novick, Kim & Lee, PLLC; Jae Youn Kim (57) ABSTRACT

A composition for controlling nematodes contains plant essential oil, and more particularly, geraniol. The composition is derived from natural substances and is thus environmentally friendly, and exhibits superior nematocidal effects without causing phytotoxicity, and thus can be efficiently used as a nematicide.

4 Claims, 4 Drawing Sheets before geraniol treatment after geraniol treatment

COMPOSITION CONTAINING GERANIOL FOR CONTROL OF PLANT-PARASITIC NEMATODES

TECHNICAL FIELD

The present invention relates to a composition for controlling nematodes containing plant essential oil, and more particularly to a composition for controlling plant-parasitic nematodes containing geraniol.

BACKGROUND ART

The first plant-parasitic nematodes to be discovered in the world, in 1743, were nematodes harming wheat. Since the discovery of seed-gall nematodes for the first time in Korea in 1919, root-knot nematodes, which severely damage various flowers and fruits and vegetables, were discovered in 1977. Currently, research into controlling root-knot nematodes is ongoing.

Nematodes are present in all soils, and some may be seen with the naked eye, but in the case of plant-parasitic nematodes, most may only be observed using a microscope. Nematodes have a thin thread-like shape without nodes, and live while moving like a snake in the absence of water. Plant-parasitic nematodes are parasitic on all parts of the plants, such as flower buds, leaves, stems, roots, and the like. In particular, it has been reported that nematodes occurring in the roots have a very strong effect on crop growth.

Root-knot nematodes take about 5-7 weeks for the life cycle of egg—first larval stage—second larval stage—third larval stage—fourth larval stage—adult—spawning. Therefore, when adult root-knot nematodes are discovered in farmhouses, actual damage thereof often progresses rapidly, and thus becomes extremely serious.

Currently, nematodes found in Korea cause great damage to melons, strawberries, cucumbers, tomatoes, peppers, cabbages, and the like, which are mainly cultivated continuously.

The correlation of nematodes with other plant pathogens (virus, late blight) is very high. The reason for this is that nematodes have a lancet, corresponding to the mouth, which damages the root mucosa, and damage to the root mucosa often leads to secondary infections such as plant viral diseases, bacterial diseases and the like. The fact that nematodes mediate viruses was discovered when it turned out that viral diseases are transmitted to vines by *Xiphinema*. Actually, root-knot nematodes also exacerbate damage caused by various fungi, such as *Fusarium, Rhizoctonia, Pythium, Phytophthora*, etc. Therefore, nematodes account for about 15-40% of all crop damage in the United States, and in the real world, damage caused by secondary fungi during cultivation is caused in a complex manner, so actually 60 to 70% of crop damage is often caused by nematodes.

Known methods of controlling such nematodes include fallowing, immersion, crop rotation, increased use of organic fertilizer, cultivation of plant against nematodes, biological control, physical control, chemical control, and the like. Most of these methods are difficult to apply in practice on farms, or in the case of chemical control methods, there is a problem in that ecosystem destruction is caused by soil pollution attributed to residual toxicity, that is, non-selective toxicity.

With regard to biological control methods, Korean Patent Application Publication No. 2007-0065938 discloses a composition for controlling root-knot nematodes containing eugenol isolated and purified from cloves, and Korean Patent Application Publication No. 2009-0002561 discloses a composition for controlling plant-pathogenic root-knot nematodes containing eugenol, thymol, carvacrol or t-anethole as an active ingredient, but it is necessary to develop nematicides having stronger nematocidal effects.

Meanwhile, geraniol is a representative monoterpene alcohol that is widely distributed in plant essential oil, and has citrus and flower scents and is mainly used as a synthetic fragrance. It is known that geraniol is able to serve as a medicament for the treatment of diseases, as disclosed in Korean Patent Application Publication No. 1995-0013512.

In addition, Korean Patent Application Publication No. 2009-0011029 discloses a nematocidal composition containing *Cymbopogon martini* (palmarosa) oil. Here, it is disclosed that the components of *Cymbopogon martini* (palmarosa) oil include geraniol.

However, in Korean Patent Application Publication No. 2009-0011029, only experimental results on a synergistic effect accomplished by using 93% canola oil, 2% palmarosa oil, and 5% polysorbate 20 are presented, and thus it is not known whether geraniol has substantial nematocidal activity, and if it has a nematocidal effect, it is not known whether phytotoxic side effects occur.

Therefore, the present inventors have made great efforts to develop naturally derived nematicides, and have ascertained that, when geraniol is used alone or in combination with other plant extracts, it has nematocidal activity on plant-pathogenic nematodes, and moreover, has optimal nematocidal activity without causing phytotoxicity at a concentration of 100 to 3000 ppm, thus culminating in the present invention.

DISCLOSURE

Technical Problem

An objective of the present invention is to provide a naturally derived composition for controlling nematodes, which has superior nematocidal activity without causing phytotoxicity and soil pollution due to residual toxicity, a formulation for controlling nematodes including the same, and a method of controlling nematodes.

Technical Solution

In order to accomplish the above objective, the present invention provides a composition for controlling plant-parasitic nematodes containing geraniol at a concentration of 100 to 3,000 ppm.

In the present invention, the above composition may further include a plant extract selected from the group consisting of a neem extract, an Ostericum koreanum extract and a clove extract.

In the present invention, the volume ratio of the plant extract and the geraniol may be 3:1 to 5:1 based on the same concentration.

In the present invention, the nematode may be at least one selected from the group consisting of a root-knot nematode, a root-lesion nematode, a spiral nematode and a cyst nematode.

In addition, the present invention provides a formulation for controlling a plant-parasitic nematode including the above composition as an active ingredient.

In addition, the present invention provides a method of controlling a plant-parasitic nematode including controlling a nematode by treating the nematode with the above composition.

Advantageous Effects

According to the present invention, a composition for controlling plant-parasitic nematodes containing geraniol at a concentration of 100 to 3,000 ppm is derived from natural substances and is thus environmentally friendly, and exhibits high nematocidal effects without causing phytotoxicity.

BEST MODE

The present invention is intended to provide a naturally derived material having nematocidal activity.

In the present invention, six types of plant-derived materials and eight types of plant extracts were evaluated for nematocidal activity.

In an embodiment of the present invention, nematocidal activity on root-knot nematodes (*Meloidogyne* spp.) was evaluated using geraniol, azadirachtin, clove oil, oregano oil, pyrethrin, oxymatrine, neem extract, *Ostericum koreanum* extract, clove extract, *Myristica fragrans* extract, *Acorus gramineus* extract, *Kaempferia galanga* extract and *Amomum cardamomum* L. extract. Based on the results thereof, when geraniol was used alone or in combination with a neem extract, clove extract or Ostericum koreanum extract, superior nematocidal activity was confirmed. In particular, when geraniol was used at 100 to 3,000 ppm, superior nematocidal effects were exhibited without phytotoxicity, but phytotoxicity was confirmed to occur upon treatment with geraniol at 4,000 ppm or more.

Therefore, an aspect of the present invention pertains to a composition for controlling plant-parasitic nematodes containing geraniol at a concentration of 100 to 3,000 ppm.

The geraniol is a monoterpene alcohol contained in plant essential oil, and may be used without limitation as to the source plant.

In the present invention, if the amount of geraniol contained in the composition for controlling plant-parasitic nematodes is less than 100 ppm, the nematocidal activity may become insignificant. On the other hand, if the amount thereof exceeds 3,000 ppm, phytotoxicity may be caused in crops.

The composition for controlling plant-parasitic nematodes according to the present invention may exhibit superior nematocidal activity even when containing geraniol alone, and in order to exhibit higher and more stable nematocidal efficiency, a plant extract selected from the group consisting of a neem extract, an *Ostericum koreanum* extract and a clove extract may be further included. Here, the volume ratio of the plant extract and the geraniol is preferably 3:1 to 5:1 based on the same concentration. If the volume ratio of the plant extract and the geraniol falls out of the above range, there is a concern in that phytotoxicity may occur.

The plant extract may be obtained using a process selected from the group consisting of typically known extraction processes, such as alcohol extraction, hexane extraction, hot-water extraction, cold-water extraction, cold compression (expression), and steam distillation.

In the present invention, the plant-parasitic nematodes may be exemplified by root-knot nematodes, root-lesion nematodes, spiral nematodes, cyst nematodes, and the like, and examples of the root-knot nematodes may include, but are not limited to, carrot root-knot nematodes, sweet-potato root-knot nematodes, Java root-knot nematodes, peanut root-knot nematodes, and the like.

In the present invention, the composition for controlling plant-parasitic nematodes may be used alone, but is not particularly limited thereto, and may further include an appropriate diluent or excipient depending on the dosage form and/or use purposes of the composition. As the excipient, a typical material may be used depending on the dosage form, and when formulated, a filler, an extender, a wetting agent, a disintegrant or a surfactant may be used. Typical examples of the diluent or excipient may include water, dextrin, calcium carbonate, lactose, propylene glycol, liquid paraffin and normal saline, and more preferably, secondary distilled water added with 0.1 ml of Triton X-100 per liter (L) is used.

Another aspect of the present invention pertains to a formulation for controlling plant-parasitic nematodes including the composition for controlling plant-parasitic nematodes as an active ingredient and to a method of controlling plant-parasitic nematodes including controlling nematodes using the composition for controlling plant-parasitic nematodes.

Here, the crops to be treated are not particularly limited, and may include one or more fruits and vegetables selected from the group consisting of all crops which are damaged or parasitized by nematodes, for example tomatoes, cucumbers, strawberries, melons, peppers, and watermelons.

Mode for Invention

A better understanding of the present invention will be given through the following examples. These examples are merely set forth to illustrate the present invention, and are not to be construed as limiting the scope of the present invention, as will be apparent to those skilled in the art.

Example 1: Evaluation of Nematocidal Activity of Naturally Derived Material

The nematodes used in the experiments were *Meloidogyne* spp. (hatched from eggs from infected roots of melons from farms in Seongju-gun, Gyeongsangbuk-do, Korea), and were propagated using tomato plants from Ecowin Co. Ltd. and used for experiments.

The tomato roots infected with root-knot nematodes were washed with running water and were then cut to a size of about 1 cm, after which 50 g of the cut roots was placed in a 500 ml round-bottom flask containing 200 ml of 0.5% sodium hypochloride (NaOCl), stopped with a rubber stopper, and shaken vigorously for 3 min to sterilize the roots and at the same time burst the egg bag. Thereafter, the solution was passed through a sieve in which 200 mesh was superimposed on 500 mesh, and washed with distilled water, so the eggs of the root-knot nematodes from which the NaOCl solution was removed were recovered.

Next, the eggs of the root-knot nematodes thus recovered were surface-sterilized with 0.5% NaOCl for 10 min, washed thoroughly with sterile distilled water, placed in a phosphate buffer (1%) containing sterilized normal saline, and hatched in an incubator at 25° C.

Each of geraniol (available from Katyani Exports), azadirachtin (available from United Agro Industries), clove oil (available from Xi'Taima), oregano oil (available from Xi'Taima), pyrethrin (available from Xi'Taima) and oxymatrine (available from Kingbo, China) was mixed with an emulsifier (PLE9) at 1:1. Thereafter, each mixed solution was diluted to 2000 ppm, 2 to 3 ml thereof was poured into a Petri dish, after which 15 hatched root-knot nematodes were placed in the Petri dish, and nematocidal activity was measured and the results thereof are shown in Table 1 below.

TABLE 1

| Classification | Geraniol | Azadirachtin | Clove oil | Oregano oil | Pyrethrin | Oxymatrine |
|---|---|---|---|---|---|---|
| 1 day | 15$^a$ | 7 | 2 | 1 | 5 | 7 |
| 2 days | — | 8 | 5 | 1 | 6 | 9 |
| 3 days | — | 10 | 7 | 3 | 11 | 10 |
| Nematocidal efficiency (%) | 100 | 66.7 | 46.7 | 20.0 | 73.3 | 66.7 |

$^a$Number of killed root-knot nematodes

As is apparent from Table 1, the 2,000 ppm geraniol dilution solution exhibited 100% nematocidal efficiency on root-knot nematodes 1 day after treatment therewith, whereas the oregano oil killed 3 root-knot nematodes 3 days after treatment therewith and thus exhibited 20.0% nematocidal efficiency, which is evaluated to be the lowest nematocidal activity.

Figure 1:
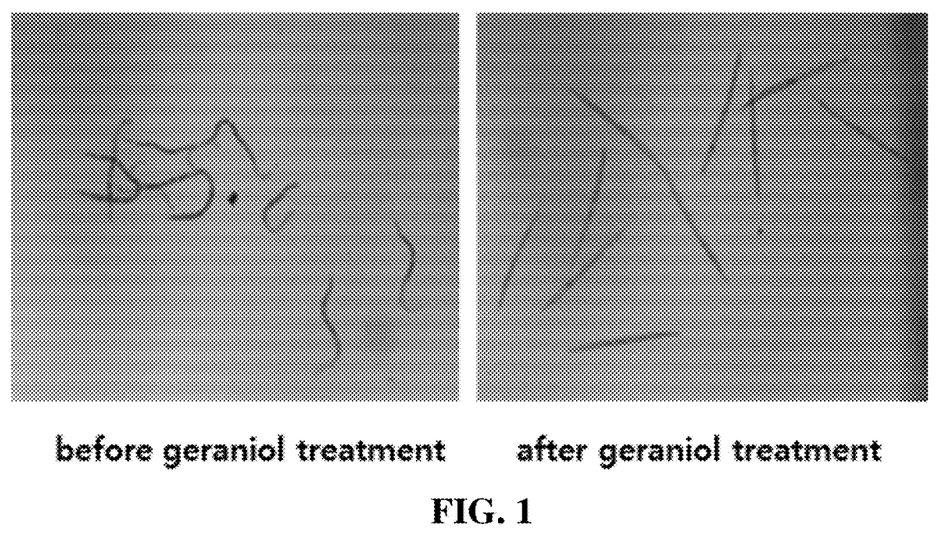
FIG. 1 shows optical microscope images at 40× magnification of root-knot nematodes before and after treatment with geraniol according to an embodiment of the present invention.

Therefore, it was determined that geraniol, among the test samples, had the best nematocidal effect on root-knot nematodes, and nematocidal activity was measured depending on the geraniol dilution factor. The results thereof are shown in Table 2 below, and the images of root-knot nematodes before and after treatment with geraniol are shown in FIG. 1.

TABLE 2

| Duration | Geraniol (ppm) | | | | | | | |
|---|---|---|---|---|---|---|---|---|
| | 10,000 | 3,000 | 2,000 | 1,000 | 500 | 333 | 200 | 100 |
| 1 day | 15$^a$ | 15 | 15 | 10 | 5 | 5 | 5 | 5 |
| 2 days | — | — | — | 15 | 10 | 6 | 7 | 7 |
| 3 days | — | — | — | — | 15 | 15 | 13 | 7 |
| Nematocidal efficiency (%) | 100 | 100 | 100 | 100 | 100 | 100 | 86.7 | 46.7 |

$^a$The number of root-knot nematodes used for the experiment on the number of killed root-knot nematodes was 15 at each dilution factor As is apparent from Table 2, the 10,000 ppm, 3,000 ppm and 2,000 ppm geraniol exhibited 100% nematocidal efficiency on root-knot nematodes 1 day after treatment therewith, and the 1,000 ppm geraniol exhibited 100% nematocidal efficiency 2 days after treatment therewith.

Moreover, the 500 ppm and 333 ppm geraniol exhibited 100% nematocidal efficiency 3 days after treatment therewith, and the 200 ppm geraniol exhibited high nematocidal efficiency of 86.7% 3 days after treatment therewith, based on which the possibility of controlling root-knot nematodes thereby was confirmed.

Example 2: Experiment of Phytotoxicity of Geraniol on Crops

Sterilized soil was uniformly mixed, 300 g thereof was then placed in each pot, and tomato seedlings not infected with root-knot nematodes were transplanted thereto. 50 ml of each of the geraniol dilution solutions (100, 200, 330, 500, 1,000, 2,000, 3,000, and 10,000 ppm) prepared in Example 1 was used for drenching treatment. Additionally, geraniol dilution solutions at 4,000 ppm, 5,000 ppm, and 20,000 ppm were further prepared, and then 50 ml of each was used for drenching treatment of each pot planted with tomato seedling. Here, the same amount of distilled water was used alone in an untreated group, and 1 week after treatment, the presence or absence of phytotoxicity was observed with the naked eye. The results thereof are shown in Table 3 below and in FIG. 2.

TABLE 3

| Geraniol concentration (ppm) | Test crop | Extent of phytotoxicity (0-5) | Phytotoxicity symptom |
|---|---|---|---|
| 100 | Tomato | 0 | No |
| 200 | | 0 | No |
| 330 | | 0 | No |
| 500 | | 0 | No |
| 1,000 | | 0 | No |
| 2,000 | | 0 | No |
| 3,000 | | 0 | No |
| 4,000 | | 5 | Withered |
| 5,000 | | 5 | Withered |
| 10,000 | | 5 | Withered |
| 20,000 | | 5 | Withered |

Figure 2:
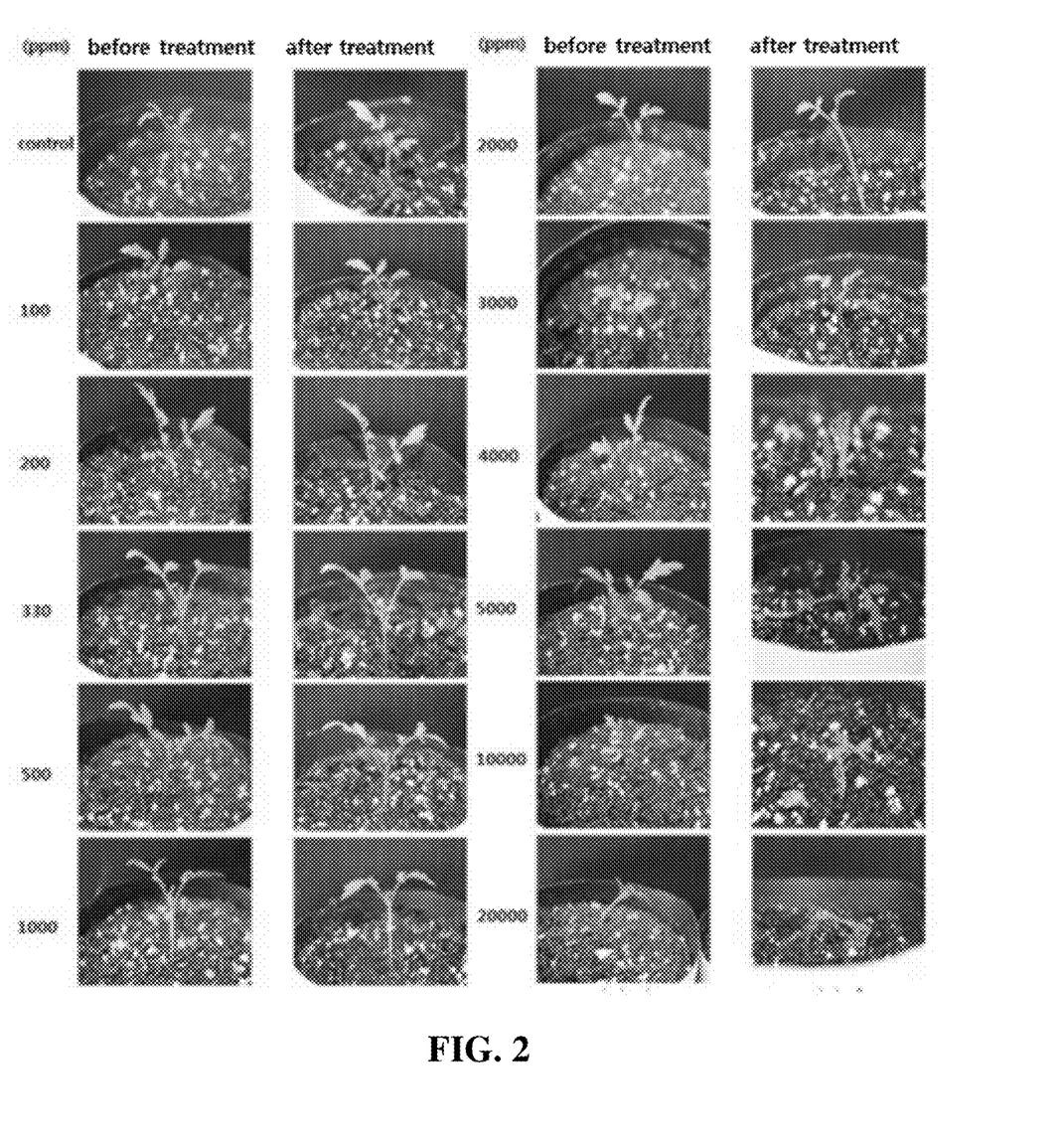
FIG. 2 is photographs showing the results of testing of phytotoxicity on tomato seedlings depending on the dilution factor of the nematocidal composition according to an embodiment of the present invention.

As is apparent from Table 3 and FIG. 2, upon treatment with geraniol at different concentrations, there were no particular phytotoxicity symptoms before or after treatment in the concentration range of 100 ppm to 3,000 ppm. However, at 4000 ppm or more, it was observed that the bottoms of the stems dried up and all tomato seedlings collapsed and withered. Therefore, it was confirmed that geraniol had no effect on tomato seedlings at concentrations of 3,000 ppm or less, but geraniol at concentrations of 4,000 ppm or more caused phytotoxicity in tomato seedlings, making it impossible to use.

Example 3: Evaluation of Nematocidal Activity of Plant Extract

Nematocidal activity on root-knot nematodes (treatment concentration: 2,000 ppm) was evaluated in the same manner as in Example 1, with the exception that *Ostericum*

*koreanum*, clove, *Myristica fragrans, Acorus gramineus, Kaempferia galanga* and *Amomum cardamomum* L. extracts were used, in lieu of the naturally derived materials. The results thereof are shown in Table 4 below. Here, *Ostericum koreanum*, clove, *Myristica fragrans, Acorus gramineus, Kaempferia galanga* and *Amomum cardamomum* L. were purchased from a medicinal plant retailer located in the Daegu area and then extracted using ethanol according to a typical method. Specifically, each medicine was finely crushed, mixed with ethanol at a ratio of 1:5, and extracted at 180 rpm at room temperature for 48 hr, after which as much ethanol as possible was concentrated using a concentrator.

TABLE 4

| Duration | Type of plant extract | | | | | |
|---|---|---|---|---|---|---|
| | Ostericum koreanum | Clove | Myristica fragrans | Acorus gramineus | Kaempferia galanga | Amomum cardamomum L. |
| 1 day | 5 | 4 | 4 | 1 | 2 | 2 |
| 2 days | 14 | 11 | 6 | 5 | 2 | 5 |
| 3 days | 15 | 15 | 6 | 6 | 2 | 8 |
| Nematocidal efficiency (%) | 100 | 100 | 40 | 40 | 13.3 | 53.3 | a: The number of inoculated root-knot nematodes used for the experiment on the number of killed root-knot nematodes was 15

As is apparent from Table 4, the *Ostericum koreanum* and clove extracts killed more than half of the root-knot nematodes 2 days after treatment therewith, and exhibited 100% mortality on the $3^{rd}$ day, but *Myristica fragrans, Acorus gramineus, Kaempferia galanga* and *Amomum cardamomum* L. exhibited mortality rates equal to or less than about 50% even on the $3r^d$ day after treatment therewith.

Example 4: Evaluation of Nematocidal Activity of Neem Extract

Nematocidal activity on root-knot nematodes was evaluated in the same manner as in Example 1, with the exception that a neem extract was used in lieu of the naturally derived materials. The results thereof are shown in Table 5 below.

TABLE 5

| Duration | Neem extract (ppm) | | | | |
|---|---|---|---|---|---|
| | 20,000 | 8,000 | 4,000 | 2,000 | 1,000 |
| 1 day | $10^a$ | 7 | 5 | 2 | 1 |
| 2 days | 13 | 9 | 10 | 4 | 2 |
| 3 days | 15 | 15 | 15 | 9 | 5 |
| Nematocidal efficiency (%) | 100 | 100 | 100 | 60 | 33.3 |

$^a$Number of killed root-knot nematodes

As is apparent from Table 5, when the dilution factor of the neem extract was 20,000 ppm, 8,000 ppm and 4,000 ppm, 15 root-knot nematodes were killed 3 days after treatment therewith, thus exhibiting 100% nematocidal efficiency, and at 2,000 ppm, 60% nematocidal efficiency was manifested. Therefore, the possibility of controlling root-knot nematodes using the neem extract at 20,000 to 4,000 ppm was confirmed.

Example 5: Evaluation of Nematocidal Activity of Mixed Solution of Geraniol and Plant Extract Synergistic effects were evaluated by mixing each of the neem extract, clove extract and *Ostericum koreanum* extract with geraniol, which showed excellent nematocidal activity.

Nematocidal activity on root-knot nematodes was evaluated in the same manner as in Example 1, with the exception that the plant extract and geraniol were mixed at a volume ratio of 4:1 (a mixed solution of geraniol and natural substance: 2500 ppm) and used as a sample. The results thereof are shown in Table 6 below.

TABLE 6

| Duration | Neem extract + geraniol (4:1) | Clove extract + geraniol (4:1) | Ostericum koreanum extract + geraniol (4:1) |
|---|---|---|---|
| 1 day | $9^a$ | 5 | 8 |
| 2 days | 13 | 11 | 13 |
| 3 days | 15 | 15 | 15 |
| Nematocidal efficiency (%) | 100 | 100 | 100 |

$^a$The number of inoculated root-knot nematodes used for the experiment on the number of killed root-knot nematodes was 15

As is apparent from Table 6, all of the mixed solution of neem extract and geraniol, the mixed solution of clove extract and geraniol, and the mixed solution of *Ostericum koreanum* extract and geraniol killed all 15 root-knot nematodes 3 days after treatment therewith, thus exhibiting 100% nematocidal efficiency.

Thereby, all three were judged to have nematocidal effects on root-knot nematodes, and pot experiments and phytotoxicity experiments were thus conducted thereon.

Example 6: Experiment on Phytotoxicity of Mixed Solution of Geraniol and Plant Extract Sterilized soil was uniformly mixed, 300 g thereof was then placed in each pot, and tomato seedlings not infected with root-knot nematodes were transplanted thereto. The sample prepared in Example 4 was diluted to a standard amount or a multiple thereof for each treatment group, and then 50 ml thereof was used for drenching treatment. Here, the same amount of distilled water was used alone in an untreated group, and 1 week after treatment, the presence or absence of phytotoxicity was observed with the naked eye. The results thereof are shown in Table 7 below and in FIG. 3.

TABLE 7

| Test drug | Test crop | Standard amount | Multiple amount | Phytotoxicity symptom |
|---|---|---|---|---|
| Neem extract + geraniol | Tomato | 0 | 0 | No |
| Clove extract + geraniol | Tomato | 0 | 0 | No |
| Ostericum koreanum extract + geraniol | Tomato | 0 | 0 | No |

Figure 3:
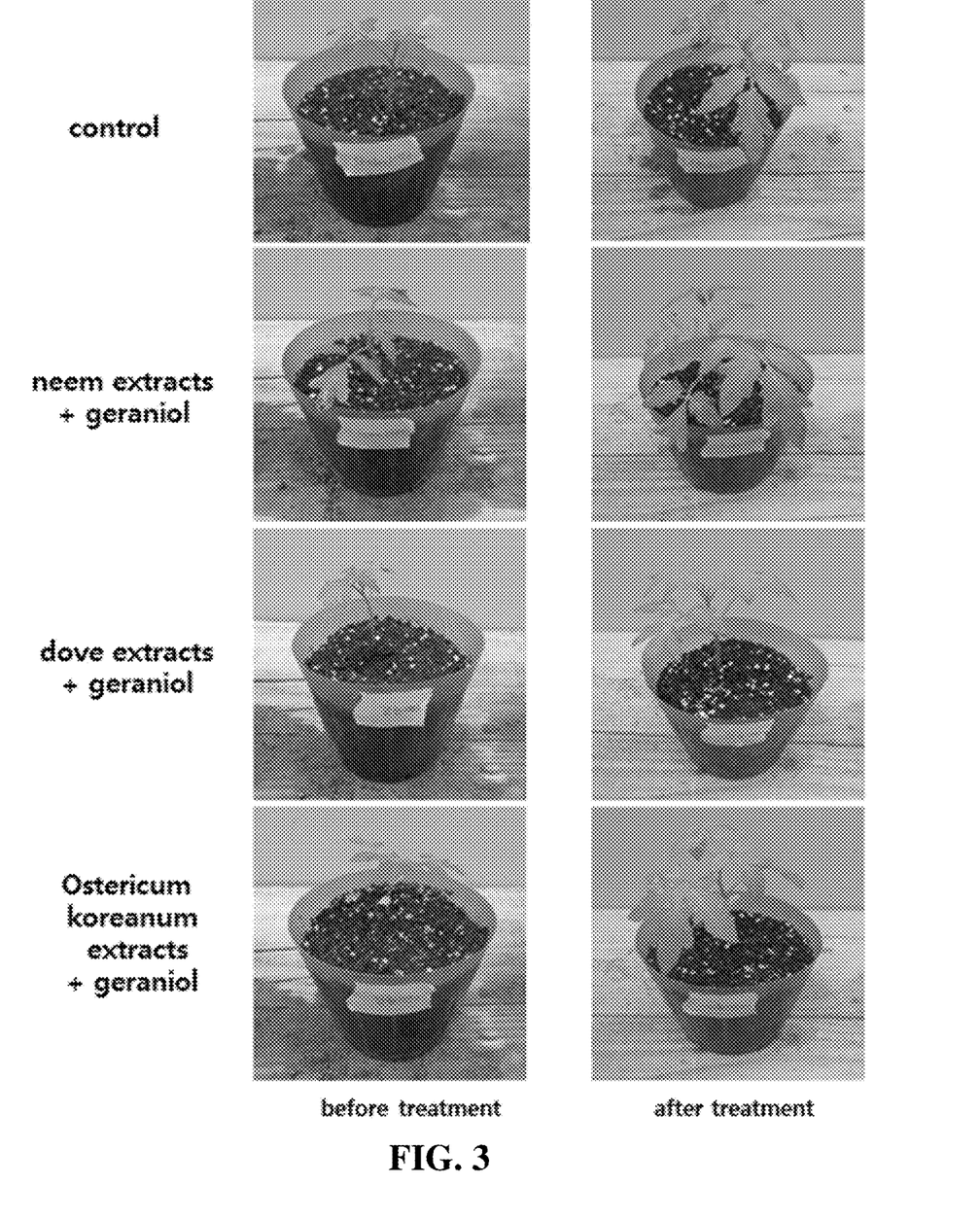
FIG. 3 is photographs showing the pot test results of mixed solutions of geraniol and plant extracts according to an embodiment of the present invention.
Figure 4:
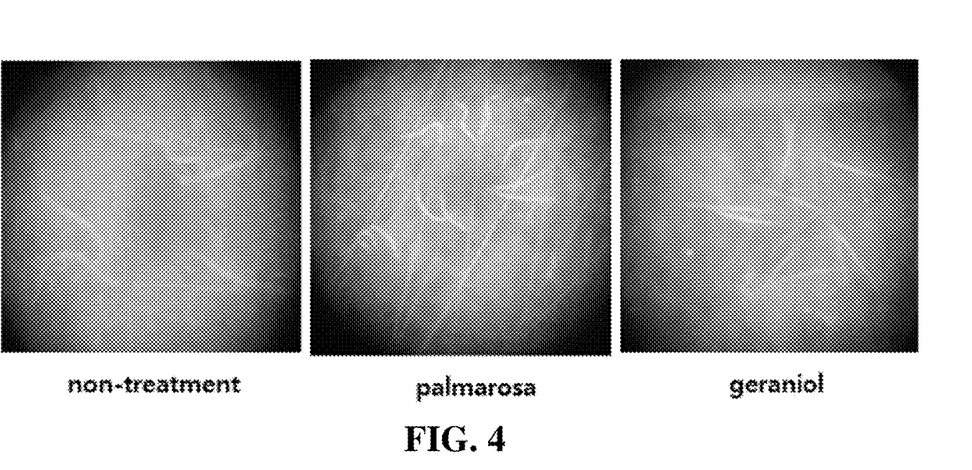
FIG. 4 is microscope images showing the nematocidal effects of geraniol and palmarosa oil including the same amount of geraniol on root-knot nematodes.

As is apparent from Table 7 and FIG. 3, there were no particular phytotoxicity symptoms before or after treatment with the mixed solution of geraniol and plant extract. Therefore, it was determined that the mixed solution of geraniol and plant extract did not cause any harm to the growth of the tomato seedlings.

Example 7: Pot Experiment on Mixed Solution of Geraniol and Plant Extract

Soil infected with root-knot nematodes was uniformly mixed, the initial root-knot nematode density was measured (number of nematodes/300 g), and 300 g of the soil infected with root-knot nematodes was placed in each pot and then treated with 50 ml of the sample prepared in Example 4. In order to prevent moisture evaporation, the pot was covered with vinyl film and then treated two times with the sample at intervals of 1 week, and after 2 weeks, the density of root-knot nematodes was measured. The results thereof are shown in Table 8 below. Here, 50 ml of distilled water was used alone in an untreated group, and the experiment was repeated three times.

TABLE 8

| | Initial density | Control | Neem extract + geraniol (4:1) | Clove extract + geraniol (4:1) | Ostericum koreanum extract + geraniol (4:1) |
|---|---|---|---|---|---|
| Density (number of nematodes/300 g) | 3,367 | 2,127 | 550 | 967 | 750 |
| Efficiency of controlling nematodes (%) | — | 36.83 | 83.66 | 71.28 | 77.72 |

As is apparent from Table 8, the initial density of root-knot nematodes in the soil was 3,367 nematodes/300 g. Based on the results of treatment of the soil infected with root-knot nematodes with each sample, the control showed a density of 2,127 nematodes/300 g, and the neem extract+geraniol (4:1), the clove extract+geraniol (4:1) and the Ostericum koreanum extract 30 geraniol (4:1) showed densities of 550 nematodes/300 g, 967 nematodes/300 g and 750 nematodes/300 g, respectively.

As for the efficiency of controlling root-knot nematodes using each drug, the neem extract+geraniol (4:1) exhibited the highest nematocidal effect of 83.66% compared to the initial density thereof, and then the Ostericum koreanum extract+geraniol (4:1) and the clove extract +geraniol (4:1) exhibited nematocidal effects of 77.72% and 71.28%, respectively. The nematocidal effect of the control was 36.83%.

Example 8: Nematocidal Effects of Geraniol on Other Plant-Parasitic Nematodes 2-3 ml of a 2,000 ppm dilution solution of geraniol (available from Katyani Exports) was poured into Petri dishes, and 15 root-lesion nematodes, 15 spiral nematodes, and 15 cyst nematodes, which are different kinds of plant-parasitic nematodes, were placed in respective Petri dishes, followed by measurement of nematocidal activity. The results thereof are shown in Table 9 below.

TABLE 9

| Classification | Root-lesion nematodes | Spiral nematodes | Cyst nematodes |
|---|---|---|---|
| 1 day | 14$^a$ | 7 | 8 |
| 2 days | 15 | 9 | 11 |
| 3 days | — | 13 | 12 |
| Nematocidal efficiency | 100 | 86.7 | 80 |

$^a$The number of nematodes used for the experiment on the number of killed root-knot nematodes was 15.

As is apparent from Table 9, nematocidal efficiency of 80% or more was exhibited on all of root-lesion nematodes, spiral nematodes and cyst nematodes.

Comparative Example 1: Nematocidal Effect of Palmarosa Oil on Root-Knot Nematodes In order to compare the nematocidal effects of palmarosa oil and geraniol, as disclosed in Korean Patent Application Publication No. 2009-0011029, a composition including 93% canola, 2% palmarosa oil (made by AOS Products Private Limited, geraniol content: about 68.5%) and 20.5% polysorbate, which were mixed together, was prepared.

The composition thus prepared was diluted to a concentration of 5% (v/v) with tap water, after which the diluted solution (geraniol concentration: 685 ppm) was vigorously stirred for 1 hr using a high-speed magnetic stirrer and allowed to stand for 30 min so that layer separation occurred, after which only the solution (A) in the lower water layer, rather than the layer formed stably on the surface, was taken, and the nematocidal activity thereof on root-knot nematodes was evaluated. The results thereof are shown in Table 10 below. Here, the solution obtained by mixing geraniol with an emulsifier (PLE9) at 1:1 as in Example 1 and performing dilution to a geraniol concentration of 685 ppm was used as a control.

TABLE 10

| | Nematocidal efficiency on root-knot nematodes (%) | | |
|---|---|---|---|
| | 1 day | 2 days | 3 days |
| Untreated | — | — | — |
| Palmarosa oil composition dilution solution (A) | 17.6 | 17.6 | 23.5 |
| Geraniol 685 ppm | 72.5 | 93.6 | 100.0 |

As is apparent from Table 10, even when the geraniol content was the same, the diluted solution of the geraniol-containing palmarosa oil composition exhibited nematocidal efficiency of 17.6% on 1-2 days and 23.5% on the 3$^{rd}$ day, whereas when using geraniol, the nematocidal efficiency was 72.5% on the $1^{st}$ day, 93.6% on the $2^{nd}$ day, and 100% on the $3^{rd}$ day, indicative of very high nematocidal effects of geraniol compared to the palmarosa oil. This is deemed to be due to the antagonistic effects of materials that make up the palmarosa oil.

Specifically, in Korean Patent Application Publication No. 2009-0011029, the nematocidal activity of palmarosa oil, which is a complex, was confirmed, but there is no description of what compounds exhibit substantial nematocidal activity, among compounds such as dihydrotagetone, thiophene, ocimene, linalool, thymol, estragole, geraniol and the like, constituting palmarosa oil. However, it was confirmed in the present invention that the material that shows substantial nematocidal activity among the compounds constituting palmarosa oil is geraniol, and the use of geraniol alone has a superior nematocidal effect about 4.2 times as high as that of palmarosa oil containing the same amount of geraniol. Furthermore, the present invention is significant in that the concentration of geraniol that can exhibit the maximum nematocidal effect without causing phytotoxicity was found to be 100 to 3,000 ppm.

Although specific embodiments of the present invention have been disclosed in detail as described above, it will be obvious to those skilled in the art that the description is merely of preferable exemplary embodiments and is not to be construed to limit the scope of the present invention. Therefore, the substantial scope of the present invention will be defined by the appended claims and equivalents thereof.

INDUSTRIAL APPLICABILITY

According to the present invention, a composition for controlling plant-parasitic nematodes containing geraniol at a concentration of 100 to 3,000 ppm is derived from natural substances and is thus environmentally friendly, and can exhibit superior nematocidal effects without causing phytotoxicity, and can thus be efficiently used as a nematicide.

The invention claimed is:

1. A composition for controlling a plant-parasitic nematode, containing geraniol at a concentration of 100-500 ppm and a neem extract in a ratio of about 4:1 with the geraniol.

2. The composition of claim 1, wherein the nematode is at least one selected from the group consisting of a root-knot nematode, a root-lesion nematode, a spiral nematode and a cyst nematode.

3. A formulation for controlling a plant-parasitic nematode comprising the composition of claim 1 as an active ingredient.

4. A method of controlling a plant-parasitic nematode comprising controlling a nematode by treating the nematode with the composition of claim 1.

* * * * *